Oct. 6, 1953

G. LIDSEEN 2,654,646

PISTON

Filed Feb. 2, 1950

Inventor
Gustave Lidseen by *[signature]* Attys.

Patented Oct. 6, 1953

2,654,646

UNITED STATES PATENT OFFICE 2,654,646

PISTON

Gustave Lidseen, Oak Park, Ill., assignor to Gustave Lidseen, Inc., Chicago, Ill., a corporation of Illinois Application February 2, 1950, Serial No. 142,030

1 Claim. (Cl. 309—33)

The present invention relates to a piston and method of making the same. More particularly, the present invention relates to a self-sealing piston which requires no additional sealing or packing means, and to a method of making such a piston.

This application is a continuation-in-part of my earlier filed copending application entitled "Cylinder and Piston Packing Means," United States Serial No. 62,035, filed November 26, 1948, now abandoned.

While many various types of pistons have been proposed in the prior art, such pistons typically employ separate packing or sealing elements, usually in the form of a ring biased or resiliently expanded into contact with the interior surface of the cylinder within which the piston is adapted to be reciprocated. The packing is generally a relatively soft, resilient material which becomes worn in use either by frictional abrasion from its contact with the cylinder walls or by contact with foreign material, such as dirt, present within the cylinder.

The present invention now provides a novel form of piston for use in hydraulic or air cylinders, pumps, syringes, grease guns, water pumps, pump oilers and the like. The piston of the present invention requires no additional or separate packing means since the construction and arrangement of the piston itself is such as to cause the piston to make or maintain sealing engagement with the interior wall of the cylinder within which it is reciprocated. Thus any possibility of packing or sealing ring wear is obviated, as well as the other disadvantages inherent with the prior art structure.

In general, the piston of the present invention comprises a cup-shaped body portion having a closed end adapted for connection to means for reciprocating the piston, such as a conventional piston rod. The open end of the body portion is defined by a beveled lip expanded radially outwardly of the body portion, and which is resiliently deformable radially inwardly of the body to conform to and maintain contact with the interior wall surfaces of the cylinder in which the piston is disposed. The beveled lip thus presents an extremely thin resiliently deformable terminal edge which extends radially outwardly beyond the exterior side wall of the piston for contacting the inner surface of the cylinder. In operation, fluid pressure generated within the cylinder is exerted against the beveled interior surfaces of the piston side walls so that the flexible terminal end of the piston body is urged outwardly into fluid tight engagement with the interior cylinder wall, thereby effectively sealing piston within the cylinder while accommodating piston reciprocation therein.

The resiliently deformable piston edge is preferably formed during machining of the cup-shaped body member to define the terminal beveled edge. The formation of the beveled edge, as by the employment of a cutting tool, results in the outward deformation of the thin resilient edge beyond the exterior side walls of the piston so that the edge is expanded radially outwardly.

It is, therefore, an important object of the present invention to provide an improved piston having an expanded resiliently deformable terminal edge adapted to sealingly engage the interior wall surfaces of a cylinder within which the piston is mounted for reciprocation.

Another important object of the present invention is to provide a piston in which the cup body member is provided with an annular free edge that is beveled and expanded radially outwardly for resiliently engaging the interior wall surface of a cylinder within which the piston is disposed for reciprocation, the beveled edge being urged during operation into resilient fluid sealing relation with the cylinder wall by fluid pressures generated within the cylinder and exerted against the beveled edge.

It is a further important object of the present invention to provide a method of making a piston from a cupped body member including the step of machining an open annular body edge to define an interior beveled face with the extreme annular edge of the face being expanded by the machining operation radially outwardly of the body to form a resilient deformable, expanded packing edge.

Other and further important objects of this invention will be apparent from the disclosures in the specification and the accompanying drawings.

Figure 1:
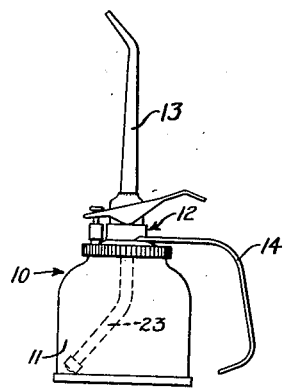
Figure 1 is a side elevational view of a pump feed oil can employing a piston of the present invention.

In Figure 1 the reference numeral 10 refers generally to a pump feed oil can comprising generally a can body 11 and a can cover 12 carrying a spout 13. The handle 14 is secured to the cover by means of a collar 15 surrounding an upstanding central housing 16 formed integrally with the cover.

The cover 12 is secured to the body 11 by means of outwardly and downwardly extending integrally formed flange 17, flange 17 being crimped over flange 18 formed in the upper portion of can body 11. An annular seal ring 19 is disposed between flanges 17 and 18 for sealing the cover 12 to the body 11. A vertical cup member 20 is secured within the housing 16 by suitable means, as by welding, the cup member 20 forming a cylinder within which piston 21, hereinafter described in more detail, is journaled for reciprocation to pump oil from the spout 13.

Figure 2:
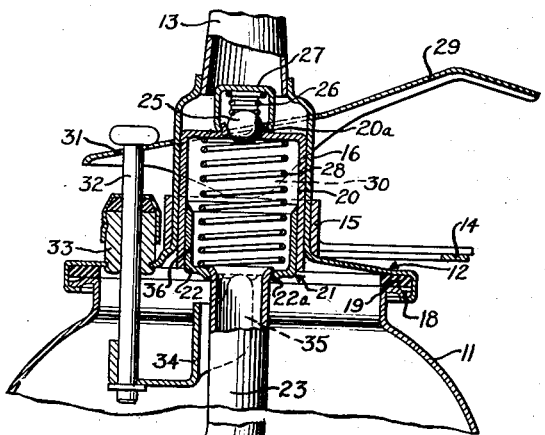
Figure 2 is an enlarged fragmentary cross-sectional view, with parts shown in elevation, of the oil can in Figure 1, showing the pump mechanism in closed position.

The closed end 22 of the piston 21 is centrally apertured as at 22a (Figures 2 and 3) to receive an oil feed pipe 23 extending downwardly to the bottom of the can, as shown in dotted outline in Figure 1. The feed pipe 23 carries at its lower end a ball check valve 24.

The upper wall of the cylinder 20 is centrally apertured as at 20a to provide a seat for a ball valve 25 urged to closed position by a spring 26, confined within an open sided cage 27 overlying the cylinder 20. The cage 27 is open to permit the flow of oil from the cylinder 20 into the spout 13 as controlled by the ball valve 25. A second spring 28 confined between the piston 21 and the cylinder 20 urges the piston 21 downwardly within the cylinder 20 to the position shown in Figure 2.

Oil is pumped from the interior of the can 11 by means of a pumping lever 29 having depending projections 30 contacting the collar 15 on diametrically opposed sides of the housing 16. The pump lever 29 is apertured adjacent one end, as at 31, to receive a pump rod 32 guided by a guide bushing 33. The pump rod 32 extends downwardly into the can 11 and carries at its lower end a bracket 34 secured thereto and having an upwardly extending projection 35 contacting the lower closed end 22 of the piston 21.

Figure 3:
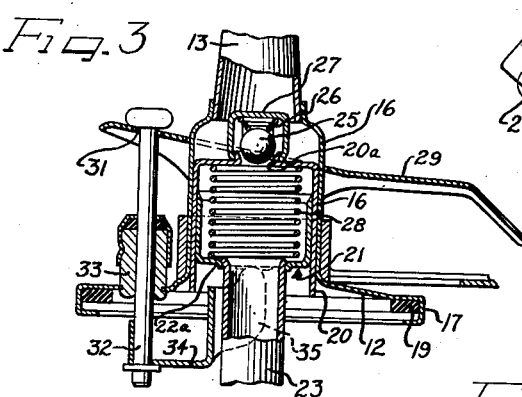
Figure 3 is a view similar to Figure 2 showing the valve of the pump mechanism in open position.

On operation of the oil can, a charge of oil is delivered through the spout 13 from the can 11 by depression of the lever 29. As shown in Figure 3, upon depression of the lever, the pump rod 32 is raised with the projection 35 bearing against the piston 21 to raise the piston within its cylinder, thus unseating the valve 25 to allow the passage of oil therethrough into the spout 13. Upon this upward movement of the piston, the valve 24 is closed so that the only exit for oil contained in the cylinder 20 is upwardly through the spout 13. Upon release of the handle 29, the check valve 24 is unseated and the ball 25 is seated so that oil flow from the can into the pipe 23 and the cylinder 20 may occur. Thus, as hereinbefore described, a charge of oil is delivered to the spout 13 from the can 11 for subsequent injection upon again pressing the lever 29.

More particularly, the novel type of piston herein provided comprises a generally cupped body member having cylindrical side walls 36 and a closed lower end 22 which is apertured as at 22a to receive the valve stem 23. The valve stem 23 is peened outwardly or otherwise flared to overlie those portions of the bottom wall 22 defining the aperture 22a.

The open end of the piston is defined by a frusto-conical upwardly and outwardly tapering surface 37 which cooperates with the cylindrical walls 36 of the piston to define an annular packing edge 38. The edge is expanded radially and outwardly from the piston walls 36 during formation of the piston, as by machining.

For the installation illustrated, the piston is preferably formed of relatively thin, inherently resilient metal stock, such as brass, with the walls 36 having a thickness on the order of 0.032 inch. During the machining of the beveled surface 37, as by countersinking or the like, the machining operation will result in the formation of an expanded, extremely thin, annular edge 38. The edge 38 thus extends radially outwardly beyond the outer periphery of the walls 36, through a distance which may suitably range from 0.0005 to 0.0025 inch.

Figure 5:
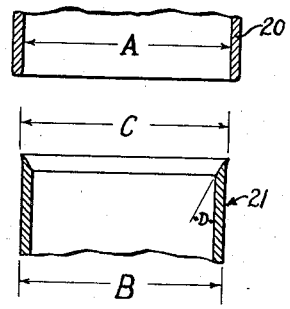
Figure 5 is a fragmentary somewhat schematic view of the piston and cylinder of Figure 4 before assembling the same.
Figure 4:
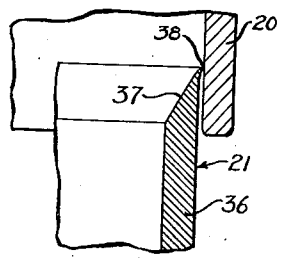
Figure 4 is a greatly enlarged fragmentary, sectional view of a piston and cylinder of the present invention.

Figure 5 illustrates a piston and cylinder before the same are assembled in the oil can 10 as hereinbefore described. In one suitable embodiment of the present invention, the dimension A, which is the inner diameter of the piston, is 0.807 inch; the dimension B, which is the exterior diameter of the piston, is 0.805 inch; and the dimension C, which is the outside diameter of the packing edge 38, is 0.809 inch. From these dimensions, it will be appreciated that the radial clearance between the outer cylindrical portion of the piston wall and the interior cylindrical wall of the cylinder is 0.001 inch, which insures guiding support for the piston along its full length of travel by the interior walls of the cylinder. Also, the radial contraction of the piston packing edge 38 upon its insertion within the cylinder is 0.001 inch which insures effective packing action.

The angle D of the beveled face 37 to the interior cylindrical surface of the cylinder wall is on the order of 60°. The resultant radial pressure component acting against the increased interior area of the beveled face causes the resilient edge 38 to be urged radially outwardly of the piston against the cylinder wall by fluid pressures developed within the cylinder upon movement of the piston therein.

Figure 6:
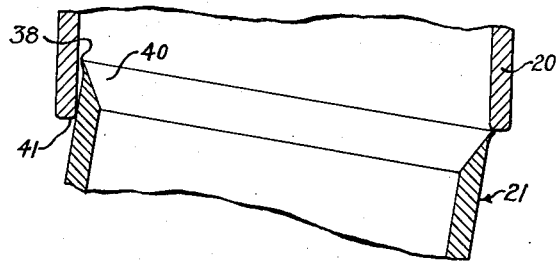
Figure 6 is a greatly enlarged, fragmentary sectional view illustrating the act of assembling the piston within a cylinder.

Because of the extreme flexibility and thinness of the resilient packing edge 38, it is preferred that the piston be assembled within the cylinder by the method illustrated in Figure 6. In accordance with this method, the piston axis is canted or inclined with respect to the axis of the cylinder, as shown in Figure 6, and one peripheral edge portion of the piston is inserted within the cylinder, as at 40. Next, the piston is rotated about its own axis and at the same time pivoted about its point of contact with the lower terminal end of the cylinder, as at 41, until the axes of the piston and the cylinder are aligned, and the entire piston packing edge is inserted within the cylinder. In this manner, any possible damage to or radial deflection of the piston packing edge 38 is prevented, and the piston may be subsequently reciprocated in the cylinder as desired with the cylindrical wall 36 of the piston guiding such movement.

It will be understood that modifications and variations may be effected without departing from the scope of the novel concepts of the present invention.

I claim as my invention:

A piston for reciprocation within a cylinder, said piston being cup-shaped and having a main cylindrical portion provided at its open end with an inner frustro-conical surface terminating in a thin resilient packing edge, said edge in its free state being of larger diameter than the cylinder with which it is to be associated and said edge extending radially outwardly beyond the external surface of said cylindrical portion.

GUSTAVE LIDSEEN.

References Cited in the file of this patent

UNITED STATES PATENTS

| Number | Name | Date |
|---|---|---|
| 1,490,849 | Philip | Apr. 15, 1924 |
| 1,531,234 | Davis | Mar. 24, 1925 |
| 1,757,016 | Langdon | May 6, 1930 |
| 1,762,602 | Widman | June 10, 1930 |
| 2,024,285 | Handlee | Dec. 17, 1935 |
| 2,139,387 | Schweiss | Dec. 6, 1938 |